United States Patent
Reumerman et al.

(10) Patent No.: US 8,265,014 B2
(45) Date of Patent: Sep. 11, 2012

(54) METHOD FOR MULTI-CHANNEL RESOURCE RESERVATION IN A WIRELESS MESH NETWORK

(75) Inventors: Hans-Jurgen Reumerman, Aachen (NL); Zang Yupeng, Aachen (NL); Guido Roland Hiertz, Aachen (DE); Gustaf Sebastian Max, Cologne (NL); Lothar Stibor, Cologne (NL)

(73) Assignee: Koninklijke Philips Electronics N.V., Eindhoven (NL)

(*) Notice: Subject to any disclaimer, the term of this patent is extended or adjusted under 35 U.S.C. 154(b) by 590 days.

(21) Appl. No.: 11/914,088

(22) PCT Filed: May 12, 2006

(86) PCT No.: PCT/IB2006/051502
§ 371 (c)(1),
(2), (4) Date: Nov. 9, 2007

(87) PCT Pub. No.: WO2006/120648
PCT Pub. Date: Nov. 16, 2006

(65) Prior Publication Data
US 2008/0232311 A1   Sep. 25, 2008

Related U.S. Application Data

(60) Provisional application No. 60/680,705, filed on May 12, 2005, provisional application No. 60/750,672, filed on Dec. 13, 2005.

(51) Int. Cl.
*H04W 4/00* (2009.01)

(52) U.S. Cl. .......... 370/329; 370/338; 370/341
(58) Field of Classification Search ............... 370/329, 370/338
See application file for complete search history.

(56) References Cited

U.S. PATENT DOCUMENTS

| | | | |
|---|---|---|---|
| 6,546,000 B1* | 4/2003 | Schroderus et al. | 370/347 |
| 7,254,399 B2* | 8/2007 | Salokannel et al. | 455/452.2 |
| 2004/0240422 A1* | 12/2004 | Kim | 370/348 |
| 2005/0058117 A1 | 3/2005 | Morioka et al. | |
| 2005/0177639 A1* | 8/2005 | Reunamaki et al. | 709/227 |
| 2005/0249170 A1* | 11/2005 | Salokannel et al. | 370/338 |
| 2006/0129850 A1* | 6/2006 | Hassan et al. | 713/300 |
| 2006/0198335 A1* | 9/2006 | Reunamaki et al. | 370/328 |
| 2006/0268908 A1* | 11/2006 | Wang et al. | 370/401 |

FOREIGN PATENT DOCUMENTS

| | | |
|---|---|---|
| JP | 2005501466 A | 1/2005 |
| JP | 2005051523 A | 2/2005 |
| WO | 03019798 A2 | 3/2003 |
| WO | 2004114598 A1 | 12/2004 |

(Continued)

OTHER PUBLICATIONS

Hiertz G et al "IEEE 802.15.3A Wireless Personal Area Networks—The MBOA Approach" European Wireless Conference, Apr. 2005.

(Continued)

*Primary Examiner* — Ricky Ngo
*Assistant Examiner* — Rasheed Gidado

(57) ABSTRACT

In a mesh network a multiband OFDM Alliance (MBOA) system provides higher channel access efficiency through a Distributed Reservation Protocol (DRP). A MBOA Physical layer (PHY) and a MBOA Medium Access Control (MAC) are used to increase the efficiency of the mesh network.

11 Claims, 3 Drawing Sheets

FOREIGN PATENT DOCUMENTS

WO    2005034419 A1    4/2005

OTHER PUBLICATIONS

Ohkawa et al "Effect of a Multi-Band OFDM-MIMO System on Frequency-Selective Propagation Characteristics" IEICE Transactions on Communications, Communications Society, Tokyo, JP vol. E88-B, No. 1, Jan. 2005.

Hiertz G et al "Multiband OFDM Alliance—The Next Generation of Wireless Personal Area Networks" Advances in Wired and Wireless Communication, 2005 IEEE/Sarnoff Symposium on Princeton New Jersey, USA Apr. 18-19, 2005.

* cited by examiner

METHOD FOR MULTI-CHANNEL RESOURCE RESERVATION IN A WIRELESS MESH NETWORK

CROSS REFERENCE TO RELATED APPLICATION

This application claims the benefit of U.S. provisional application Ser. No. 60/680,705 filed May 12, 2005, and U.S. provisional application Ser. No. 60/750,672 filed Dec. 13, 2005 which are incorporated herein by reference.

A MBOA (MultiBand OFDM Alliance) is a distributed system for WPAN (Wireless Personal Area Networks) running on an Ultrawide band (UWB) frequency band. A mesh network is a type of Personal Area Network (PAN) that can operate as a WPAN. A mesh network generally employs one of two basic connection arrangements, full mesh topology or partial mesh topology. In the full mesh topology, each node in the PAN is connected (or communicates) directly to each of the other nodes. In the partial mesh topology, some nodes are connected (or communicate) to all the other nodes in the PAN, but some of the nodes are connected (or communicate) only to those other nodes with which they exchange the most data. Mesh networks have the capability of providing an expansion of overall network coverage without increasing transmit power or receive sensitivity of each node. Mesh networks also enhance communication reliability via route redundancy. A mesh network provides network configurations that are easier to establish than previous networks, and may result in better node or device battery life due to necessitating fewer retransmissions from one node to another.

Wireless mesh networks are considered multihop systems in which devices assist each other in transmitting packets through the network. Devices tend to assist each other in transmitting packets through the network more often in adverse communication conditions. Service providers can set up an ad hoc network with minimal preparation, and the resulting network provides a reliable, flexible system that can be extended to thousands of devices.

The wireless mesh network topology, which was developed at MIT for industrial control and sensing, is a point-to-point-to-point, or peer-to-peer, system called an ad hoc, multihop network. A node in the such a network can send and receive messages. A node may also function as a router and can relay messages for its neighboring nodes or devices. Referring to FIG. 1, through the relaying process, a packet of wireless data finds its way to its destination by passing through intermediate nodes with reliable communication links. In a wireless mesh network 10, multiple nodes, 12, 14, 16, cooperate to relay a message from an origin node 18 to its destination node 20. The mesh topology 10 enhances the overall reliability of the network, which is particularly important and useful when operating in harsh industrial environments.

Like the Internet and other peer-to-peer router-based networks, a mesh network 10 offers multiple redundant communications paths throughout the network. If one link between nodes fails (e.g. between node 14 and 16) for any reason (including the introduction of strong RF interference), the network automatically routes messages through alternate paths (e.g. from node 14 to node 22 and then to node 20).

In a mesh network, you can shorten the distance between nodes, which dramatically increases the link quality. If the distance between nodes is reduced by a factor of two, the resulting signal is at least four times more powerful at the receiver. This makes links more reliable without having to increase transmitter power in individual nodes. In a mesh network, you can extend the reach, add redundancy, and improve the general reliability of the network simply by adding more nodes to the network.

Ultra wideband (UWB) is a wireless technology for transmitting large amounts of digital data over a wide spectrum of frequency bands with very low power for a short distance. Ultra wideband radio can carry a huge amount of data over a distance up to 230 feet at very low power (less than 0.5 milliwatts) and has the ability to carry signals through doors and other obstacles that tend to reflect signals at more limited bandwidths operating at a higher power. Ultra wideband is comparable with another short-distance wireless technology, such as Bluetooth, which is a standard for connecting handheld wireless devices with other similar devices and/or to, for example, desktop computers.

Ultra wideband broadcasts digital pulses, which are timed very precisely, on a carrier signal across a very wide spectrum (on a plurality of frequency channels) at the same time. The wideband transmitter and receiver must be coordinated to send and receive pulses with a high accuracy of within trillionths of a second. On any given frequency band used in an ultra wideband system, an ultra wideband signal requires less power than a normal signal on the band. Furthermore, the anticipated background noise of an ultra wideband signal is so low that theoretically no interference is possible.

Ultra wideband is being used in various situations, to date two prevalent applications of UWB include applications involving radar, in which the signal penetrates nearby surfaces, but reflects surfaces that are farther away, allowing objects to be detected behind walls or other coverings, and voice and data transmission using digital pulses, allowing a very low powered and relatively low cost signal to carry information at very high rates within a restricted range.

Embodiments of the present invention provide a multi-channel mesh network that utilizes a MBOA PHY and a MBOA MAC. The MBOA MAC uses a multi-channel DRP. The MBOA PHY may operate in an UWB frequency band.

Embodiments of the invention may use an MBOA MAC that uses a contention-free channel access method. The contention free channel access method may be a DRP, but may be another form of a channel reservation method.

In yet additional embodiments of the invention, in an MBOA MAC the beacon signal from a station includes reservation information between stations for a particular channel.

Also embodiments of the invention provide a MBOA MAC that includes informational elements (IEs) and further, wherein one of the information elements is the channel ID of a channel that a communication reservation between stations is being made.

Embodiments of the invention provide a multiband mesh network or MBOA that provides a high degree of channel access via a distributed Reservation Protocol (DRP). Furthermore, embodiments of the present invention provide a MBOA PHY that is also used to increase the efficiency of the mesh network.

The above summary of the invention is not intended to represent each embodiment or every aspect of the present invention.

A more complete understanding of the method and apparatus of the present invention may be obtained by reference to the following Detailed Description when taken in conjunction with the accompanying Drawings wherein.

Figure 4:
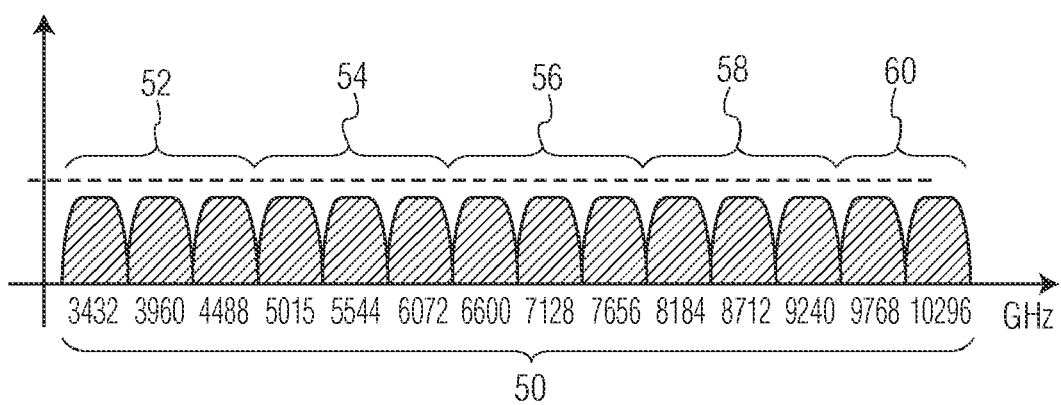
Figure 5:
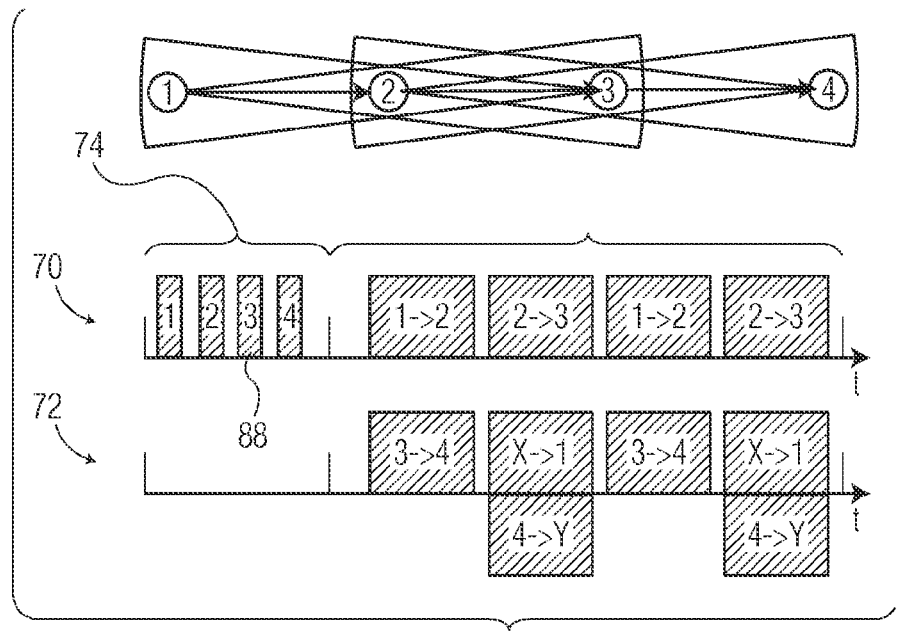
Figure 6:
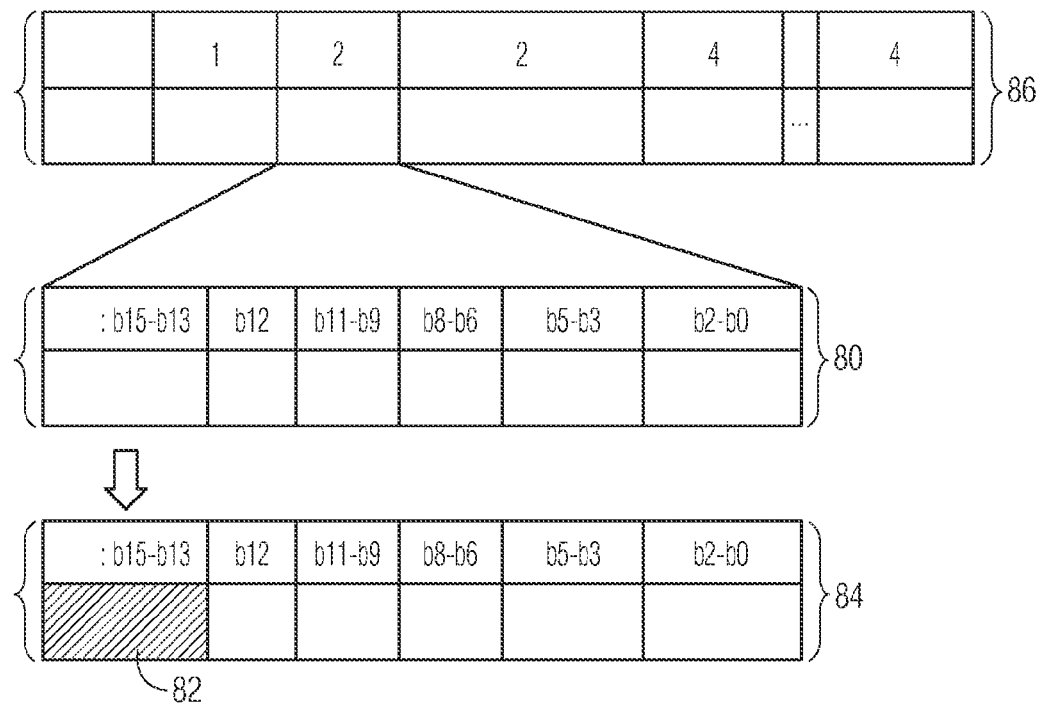

FIG. 4 an graph of an exemplary band group allocation in an MBOA PHY;

FIG. 5 depicts a section of a multihop route from station 1 to station 4 and the hop efficiencies when an exemplary multichannel DRP is used; and FIG. 6 in an exemplary extension of the DRP IE format in an exemplary MBOA MAC specification.

Figure 1:
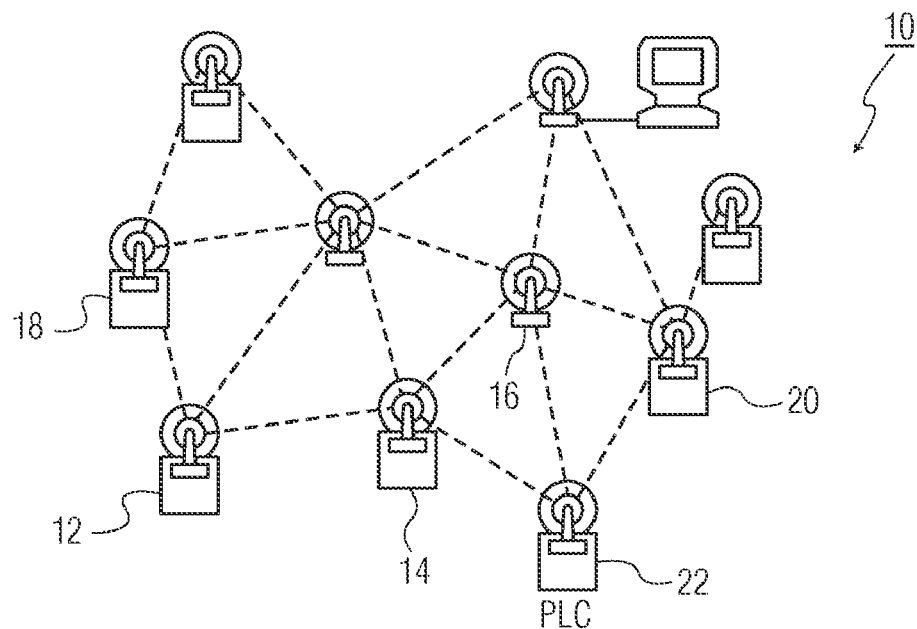
FIG. 1 is an exemplary mesh network.
Figure 2:
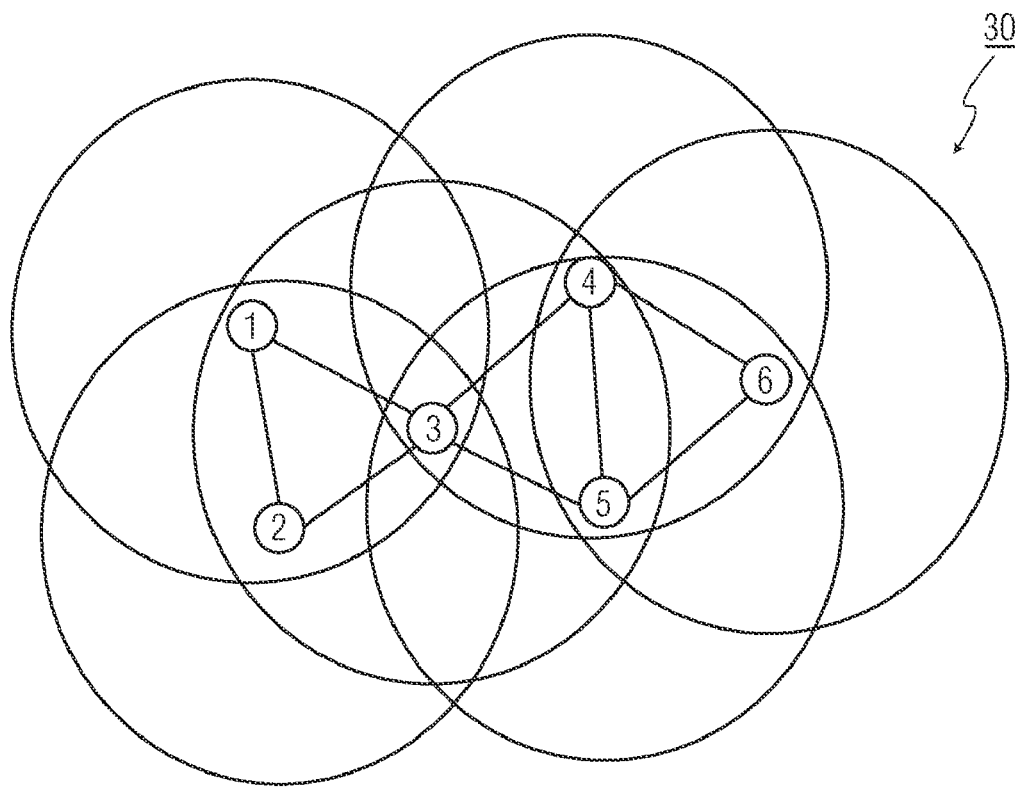
FIG. 2 is a depiction of the coverage of an exemplary wireless mesh network.

It is expected that future wireless networks will be based on mesh networks 10, 30 like those shown in FIGS. 1 and 2. Mesh networks with an ad hoc multihop wireless infrastructure can extend the network's geographical coverage while increasing network stability. An exemplary mesh network 30 is shown in FIG. 2. The geographical coverage range of each wireless station is extended through multi hop. For example, station 1 can communicate with station 6 through 3 hops (1->3->5->6) even if stations 1 and 6 are out of transmission or reception range of each other. A network's robustness is also improved because of route redundancy. Route redundancy is being able to use alternate routing between two nodes. For instance, from station 3 to station 6 various routes are available (e.g. 3-4-6; 3-5-6; 3-4-5-6; and 3-5-4-6). If one route between stations is unavailable another route can be successfully utilized.

Figure 3:
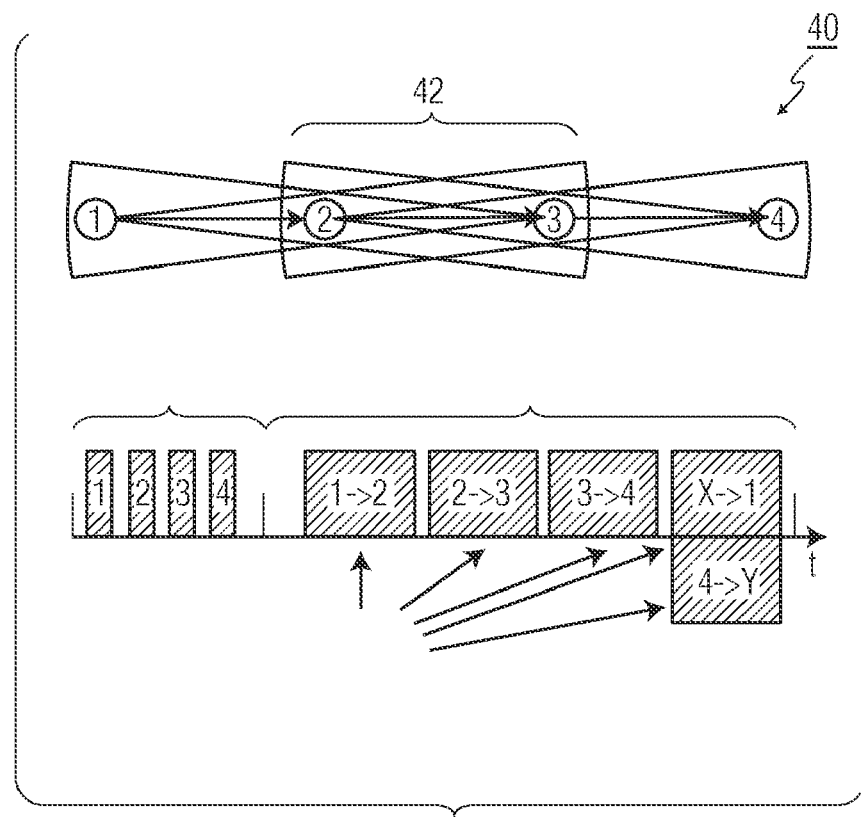
FIG. 3 depicts a section of a unidirectional multihop route from station 1 to station 4 and the hop efficiencies when a single channel is used.

However, one problem with present day wireless mesh networks is that wireless mesh network capacity and its spectrum efficiency drop down drastically in multihop scenarios due to the interference created from neighboring stations that are operating on the same channel. The situation becomes even worse if a higher Physical Layer (PHY) mode is used. A higher PHY layer induces a shorter reception range between nodes. The shorter reception range requires the nodes to be more closely spaced. A closer spacing between nodes creates more interference between nodes. The shorter reception range requires more hops between nodes, but with the same interference range on each hop the forwarding efficiency and the system capacity drops significantly. Referring to FIG. 3, the efficiency of forwarding data through nodes drops when a single channel is used or reserved for the forwarding function. A section of a unidirectional multihop route 40 from station 1 to station 4 via station 2 and 3 is shown here. With the interference range 42 shown in the figure, if one of the four stations 1, 2, 3, 4 is transmitting, then the other stations have to be mute. Thus, spatial channel reuse can only be accomplished efficiently when the two transmitters are far from each other. In FIG. 3, the forwarding efficiency of the multihop route is much lower than 50% because of the single channel limitation.

An exemplary method in accordance with an embodiment of the present invention uses an ad hoc mesh network 10, 30 with a MBOA PHY and Medium Access Control (MAC) to decrease the amount of interference encountered between nodes. It should be understood that certain embodiments of the invention are applicable to any kind of wireless communication technology, where multiple bands or channels may be used for forwarding by the participating devices. Without loss of generality and to serve as an example of an exemplary embodiment of the inventions, an embodiment of the present invention provides a wireless mesh network using an MBOA MAC and MBOA PHY.

Referring to FIG. 4, an exemplary band group allocation is shown for a MBOA PHY in accordance with an embodiment of the invention. The exemplary MBOA PHY runs on a UWB frequency band. The available 7.5 GHz bandwidth 50 is divided into 14 bands and further into 5 band groups; band group one 52, band group two 54, band group three 56, band group four 58, and band group five 60, as shown in FIG. 4. By applying Time-Frequency Coding (TFC) to each of the 5 band groups, the exemplary MBOA PHY can provide a total of 30 physical channels in the whole UWB frequency band. The first band group 52, which provides up to 7 channels, may be mandatory in certain embodiments.

To improve the media access control (MAC) efficiency in an exemplary mesh network 30, the MBOA MAC of the exemplary network uses a contention-free channel access method, namely a Distributed Reservation Protocol (DRP). An exemplary DRP's process is described in brief as follows:

The stations that have a data traffic requirement negotiate for establishing the DRP reservation either explicitly by using DRP command frames or implicitly by including the intended DRP reservation information in their beacons 88.

Once the DRP reservation is established, the DRP reservation information should be included in the beacons of both the reserving transmitter and receiver(s), in order to make all other stations aware about the reserved channel time duration.

No station, other than the owners of the reservation, is allowed to transmit in the same channel during the reserved time duration.

The established DRP reservation will be valid as long as the reservation information is included in the beacons of the reserving transmitting and receiving stations owners.

According to the exemplary MBOA MAC specification, reservations can be made only in one single channel, i.e., the channel where beacons are transmitted and received in an exemplary mesh network with ad hoc multihop infrastructure 30.

In another embodiment of the inventions and for the purpose of increasing the forwarding efficiency and system capacity of an MBOA WPAN, the exemplary DRP protocol is extended to a Multi-Channel DRP. When compared to prior art single channel DRP, shown in FIG. 3, an exemplary Multi-Channel DRP can effectively increase the spectrum reuse and forwarding efficiency, as depicted in FIG. 5. In FIG. 5, both channels one 70 and two 72 are used. It is easy for one of ordinary skill in the art to see that the forwarding efficiency is improved when a multi-channel DRP is used. Comparing the exemplary embodiment to the multihop scenario shown in FIG. 3, stations using the exemplary Multi-Channel DRP can reach a forwarding efficiency of 50% or more through multi-channel transmission.

In order to establish and make use of Multi-Channel DRP without conflict with the original MBOA MAC, the exemplary DRP is extended as follows:

One channel of a plurality of channels in the mesh network is chosen to be the Main Channel (MCH) 70. All stations belonging to the same WPAN should transmit their and receive other stations's beacons in the Beacon Period (BP) 74 of MCH 70.

DRP reservation negotiation and announcement should only happen in MCH 70.

The DRP is processed as described in the MBOA MAC Specification (of the Multiband OFDM Alliance, which is incorporated herein by reference), except that the Information Elements (IEs) 80, used to identify the DRP reservation, carry reservation information including not only the start time and the length of the reservation duration, but also the channel identification (CHID) 82 of the channel where the intended reservation is made, which is probably a channel other than the MCH 70. A suggested and exemplary extension 84 of the DRP IE is shown in FIG. 6.

Stations that support Multi-channel DRP have to use the same timing information specified in the MCH 70. During the BP 74, every station belonging to the same WPAN has to return to MCH 70 for exchanging beacons. No reservation is allowed during the time duration of the BP 74. That is no reservation can be made on the MCH 70 or any other channel during the time duration of the BP 74.

FIG. 6 shows an exemplary extension to the DRP IE format in MBOA MAC specification (v0.93). Embodiments of the invention allow for a common signaling channel for both beaconing and DRP negotiation. Furthermore, a field 82 in the DRP IE 84 of MBOA MAC 86 is used to identify the channel of the intended DRP reservation. Also, an exemplary beacon 88 carries information about the channel in which upcoming reservations are scheduled and the beacons may indicate absence or presence of devices on certain channels.

Many variations and embodiments of the above-described invention and method are possible. Although only certain embodiments of the invention and method have been illustrated in the accompanying drawings and described in the foregoing Detailed Description, it will be understood that the invention is not limited to the embodiments disclosed, but is capable of additional rearrangements, modifications and substitutions without departing from the invention as set forth and defined by the following claims. Accordingly, it should be understood that the scope of the present invention encompasses all such arrangements and is solely limited by the claims as follows.

What is claimed is:

1. A method of contention-free multi-channel resource reservation in a wireless mesh network of a plurality of stations, the network using a Multiband Orthogonal Frequency Division Multiplexing Alliance (MBOA) physical layer (PHY) with medium access control (MAC) and Ultrawide band (UWB), said method comprising the acts of:

selecting a first channel of a plurality of physical channels in the UWB for negotiation, reservation, and announcement, each of the plurality of stations transmitting and receiving beacons from other stations in a beacon period of the first channel;

carrying, in a beacon, reservation information including a start time and a reservation duration; and establishing a channel access reservation by including reservation information in beacon of reserving stations and or more intended receiver stations; and providing the plurality of physical channels, wherein the providing act comprises the acts of:

subdividing the UWB into a plurality of bands and a plurality of band groups; and applying time-frequency coding to each of the plurality of band groups wherein the beacons include information elements and make the plurality of stations aware of a reserved channel of the plurality of physical channels and transmission duration, wherein the information elements carry the reservation information including an identification of the reserved channels where a reservation is made, wherein during the beacon period, each station of the wireless mesh network returns to the first channel for exchanging the beacons, and reservations are not allowed during the beacon period, wherein reservation negotiating and announcing only occur in the first channel and does not occur in remaining channels of the plurality of physical channels, and wherein the reservations are valid as long as the reservation information is included in the beacons of the reserving stations and the one or more intended receiver stations.

2. The method of claim 1, wherein the method comprises distributed reservation protocol (DRP).

3. The method of claim 1, wherein said PHY provides seven to about 30 physical channels.

4. The method of claim 1, wherein said MAC uses a contention-free channel access method established by a method selected from explicit and implicit methods.

5. The method of claim 4, wherein said contention-free channel access method is a multi-channel distributed reservation protocol (DRP).

6. The method of claim 4 wherein, in the explicit method, at least one station establishes the channel access reservation by using distributed reservation protocol (DRP) command frames, and in the implicit method, the at least one station includes intended DRP reservation information in the beacon.

7. The method of claim 1, further comprising the act of using a common signaling channel for beaconing and negotiation.

8. The method of claim 7, wherein the beacons indicate the presence or absence of a station communicating on a particular channel.

9. The method of claim 7, further comprising the act of including a channel identification (ID) field in the information elements of the MBOA MAC.

10. The method of claim 1, wherein an information element of the information elements includes a channel identification of a channel where an intended reservation is made.

11. The method of claim 1, wherein said reserved channel is not the first channel.

* * * * *